United States Patent [19]
Borchardt et al.

[11] Patent Number: 5,135,711
[45] Date of Patent: Aug. 4, 1992

[54] BWR RECIRCULATION SYSTEM

[75] Inventors: Gary I. Borchardt; Larry E. Fennern; Wayne Marquino, all of San Jose, Calif.

[73] Assignee: General Electric Company, San Jose, Calif.

[21] Appl. No.: 715,516

[22] Filed: Jun. 14, 1991

[51] Int. Cl.⁵ .................................... G21C 15/02
[52] U.S. Cl. ........................... 376/372; 376/407; 376/379
[58] Field of Search ............... 376/372, 373, 379, 406, 376/407

[56] References Cited

U.S. PATENT DOCUMENTS

| | | | |
|---|---|---|---|
| 3,621,926 | 11/1971 | Townsend | 176/56 |
| 4,663,116 | 5/1987 | Masuhara et al. | 376/372 |
| 4,696,792 | 9/1987 | Hobson | 376/377 |
| 4,847,043 | 7/1989 | Gluntz | 376/372 |
| 4,879,087 | 11/1989 | Akiyama et al. | 376/372 |

OTHER PUBLICATIONS

Wilkins et al, *Advanced BWR: Design Improvements Build on Proven Technology,* Nuclear Engineering International, reprint Jun. 1986, pp. 1-7 and drawing entitled "The World's Reactors No 89".

T. Baumeister, *Standard Handbook For Mechanical Engineers,* 1967, Title and copyright pages, and pp. 14-16 through 14-19.

Foster et al, "Basic Nuclear Engineering", 1977, pp.: cover, copyright, 436-439 and 443-446.

*Primary Examiner*—Brooks H. Hunt
*Assistant Examiner*—Frederick H. Voss
*Attorney, Agent, or Firm*—Robert R. Schroeder

[57] ABSTRACT

A BWR coolant recirculation system includes a pump deck disposed in a downcomer and fixedly joined to a reactor pressure vessel and reactor core shroud. A plurality of circumferentially spaced reactor internal pumps (RIPs) are joined to the deck and operable in a pumping mode for pumping downwardly a reactor coolant from the downcomer and into a core inlet. In a pump inoperable mode, a portion of the coolant bypasses the RIPs for allowing increased natural recirculation of the coolant from the downcomer and into the core inlet.

9 Claims, 3 Drawing Sheets

BWR RECIRCULATION SYSTEM

TECHNICAL FIELD

The present invention relates generally to boiling water reactors, and, more specifically, to a reactor coolant recirculation system therefor.

BACKGROUND ART

In one conventional boiling water reactor (BWR) a cylindrical pressure vessel includes in serial flow communication from the bottom thereof to the top thereof a reactor core for heating a reactor coolant, such as water, for generating steam, an upper plenum in which a water and steam mixture rises, a moisture separator for removing a majority of the liquid from the steam, and a steam dryer for removing substantially all the remaining moisture from the steam. The dried steam is discharged from the vessel through an outlet nozzle for flow to a conventional steam turbine. Surrounding the reactor core is an annular core shroud which is spaced radially inwardly from the reactor pressure vessel to define an annular downcomer. Disposed near the top of the upper plenum is a conventional feedwater sparger which receives relatively cool feedwater which is discharged into the reactor coolant for flow down the downcomer.

Since the reactor coolant is heated in the core its density decreases and it rises through the core and the upper plenum. The coolant is then mixed with the feedwater which lowers its temperature, and therefore increases its density, and then the reactor coolant flows downwardly by gravity through the downcomer to a lower plenum of the reactor pressure vessel disposed below the core. The reactor coolant turns from a downward direction to an upward direction in the lower plenum and enters an inlet of the reactor core to repeat this natural recirculation process.

In order to increase reactor coolant recirculation, BWRs typically include some form of pump in the downcomer, such as an impeller-driven reactor internal pump (RIP) or a fluid-driven jet pump. Such pumps are mounted to an annular pump deck disposed in the downcomer which separates the downcomer from the lower plenum. The pumps are spaced circumferentially around the pump deck and force, or pump, the reactor coolant from the downcomer into the lower plenum, and in turn into the core inlet. The pump deck seals the downcomer from the lower plenum for allowing effective pumping action of the pumps. Without the pump deck to seal the downcomer, a significant portion of the pressurized reactor coolant discharged from the pumps would recirculate upwardly in the downcomer into the pump inlet which would decrease the total flow into the core.

Impeller-driven RIPs are typically preferred in modern BWRs since they provide effective pumping capacity in a relatively short length as compared to conventional jet pumps. However, following a pump trip in which the pumps are rendered inoperable, natural recirculation of the reactor coolant is substantially inhibited by the RIPs, and primarily by the impellers thereof. Although the pump deck prevents local recirculation in the downcomer while the RIPs are operable in the pumping mode, it also prevents natural recirculation of the reactor coolant following the pump trip when the RIPs are rendered inoperable.

OBJECTS OF THE INVENTION

Accordingly, it is one object of the present invention to provide a new and improved coolant recirculation system for a boiling water reactor.

Another object of the present invention is to provide a reactor coolant recirculation system having improved natural coolant recirculation following a pump trip.

Another object of the present invention is to provide a reactor coolant recirculation system having little or no local coolant recirculation around the recirculation pump in the reactor downcomer during a pumping mode while allowing natural recirculation downwardly in the downcomer during a pump inoperable mode.

DISCLOSURE OF INVENTION

A BWR coolant recirculation system includes a pump deck disposed in a downcomer and fixedly joined to a reactor pressure vessel and reactor core shroud. A plurality of circumferentially spaced reactor internal pumps (RIPs) are joined to the deck and operable in a pumping mode for pumping downwardly a reactor coolant from the downcomer and into a core inlet. In a pump inoperable mode, a portion of the coolant bypasses the RIPs for allowing increased natural recirculation of the coolant from the downcomer and into the core inlet.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawings in which:

MODE(S) FOR CARRYING OUT THE INVENTION

Figure 1:
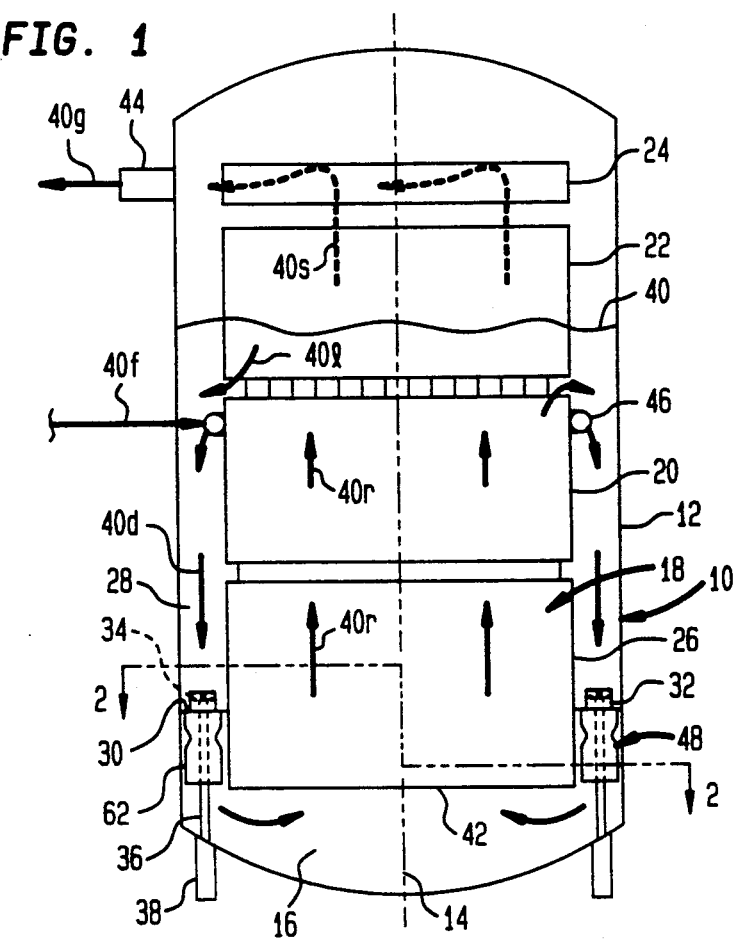
Fig. 1 is a schematic, sectional elevation view of an exemplary boiling water reactor having a coolant recirculation system in accordance with one embodiment of the present invention.

Illustrated schematically in FIG. 1 is an exemplary boiling water reactor (BWR) 10 including a cylindrical reactor pressure vessel 12 having bottom and top heads disposed about a longitudinal centerline axis 14. The BWR 10 includes in serial flow communication conventional components including a lower plenum 16, an annular reactor core 18, an annular upper plenum 20, a steam separator 22, and a steam dryer 24. Surrounding the reactor core 18 is a conventional, cylindrical core shroud 26 spaced radially inwardly from the reactor pressure vessel 12 to define a conventional annular downcomer 28. An annular pump deck 30 is disposed in the downcomer 28 and is conventionally fixedly joined to the vessel 12 and the core shroud 26.

A plurality of circumferentially spaced, conventional reactor internal pumps (RIPs) 32 are fixedly joined to the deck 30. Each of the RIPs 32 includes an impeller 34 fixedly joined to a drive shaft 36 which extends downwardly through the lower plenum 16 and the bottom of the vessel 12, and is joined to a conventional motor 38 for conventionally driving the impeller 34.

The vessel 12 is filled with a reactor coolant 40, such as water, to a level above the core 18 and the upper plenum 20 which is used both for cooling the core 18 and for generating steam. More specifically, the coolant 40 enters a bottom inlet 42 of the core 18 to cool the core 18, which coolant 40 is therefore, heated thereby. The heated reactor coolant 40, therefore, has a reduced density and rises in the core 18 and the upper plenum 20 as designated by the upward arrows 40r. The rising reactor coolant 40r becomes a mixture of liquid and steam, with an increasing amount of steam, or steam void fraction, as it rises through the core 18. The steam, designated 40s, is dispelled upwardly from the top level of the reactor coolant 40, separated from moisture in both the steam separator 22 and the steam dryer 24, and is discharged from the vessel 12 through a conventional outlet nozzle 44 for flow to a conventional steam turbine (not shown).

Water lost from the reactor vessel 12 is replenished by feedwater 40f conventionally channeled into the vessel 12 and discharged from a conventional feedwater sparger 46 disposed near the top of the upper plenum 20. The feedwater 40f is mixed with liquid $40_1$ separated by the steam separator 22 thereby lowering its temperature and increasing its density for flow downwardly in the downcomer 28 as shown by the flow arrows 40d. The downcomer coolant flow 40d enters the RIPs 32, is pressurized by the impellers 34, and is discharged into the lower plenum 16 wherein it turns upwardly to enter the core inlet 42 and repeat the recirculation loop.

While the RIPs 32 are operated in the pumping mode, the reactor coolant 40 recirculates up through the core 18 and down through the downcomer 28. However, when the RIPs 32 are in an inoperable mode following a pump trip, the impeller 34 does not rotate but remains stationary and the RIPs 32, including the impellers 34, inhibit the natural recirculation of the coolant 40 downwardly through the downcomer 28. Accordingly, the flowrate of the rising reactor coolant 40r is also reduced which reduces the ability to cool the reactor core 18.

Figure 2:
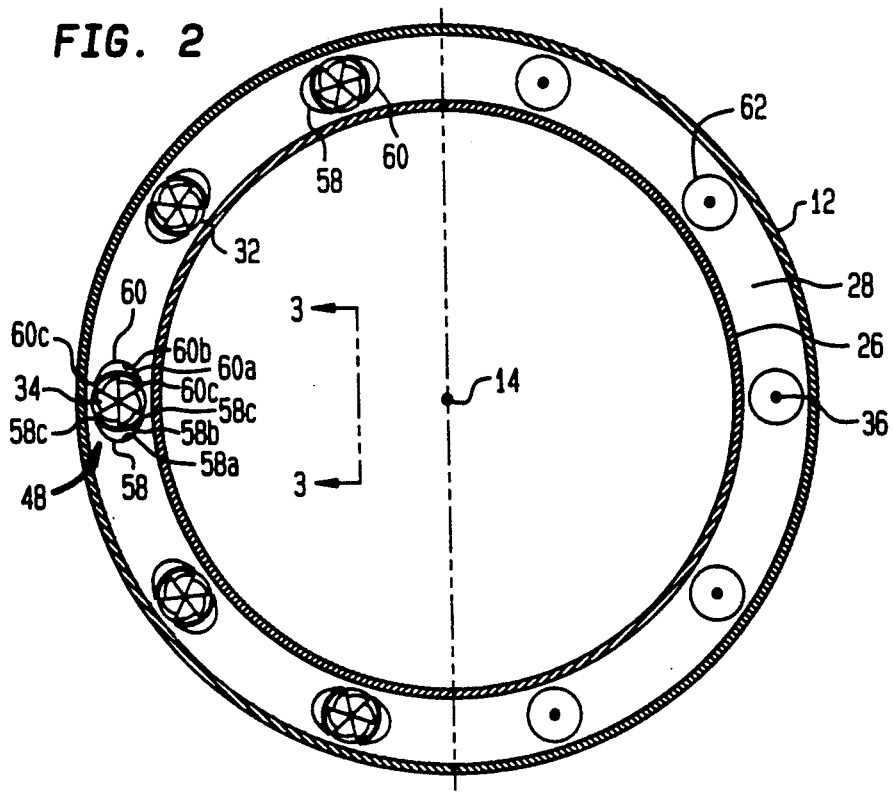
FIG. 2 is a transverse sectional view of the reactor illustrated in FIG. 1 taken along line 2—2.
Figure 3:
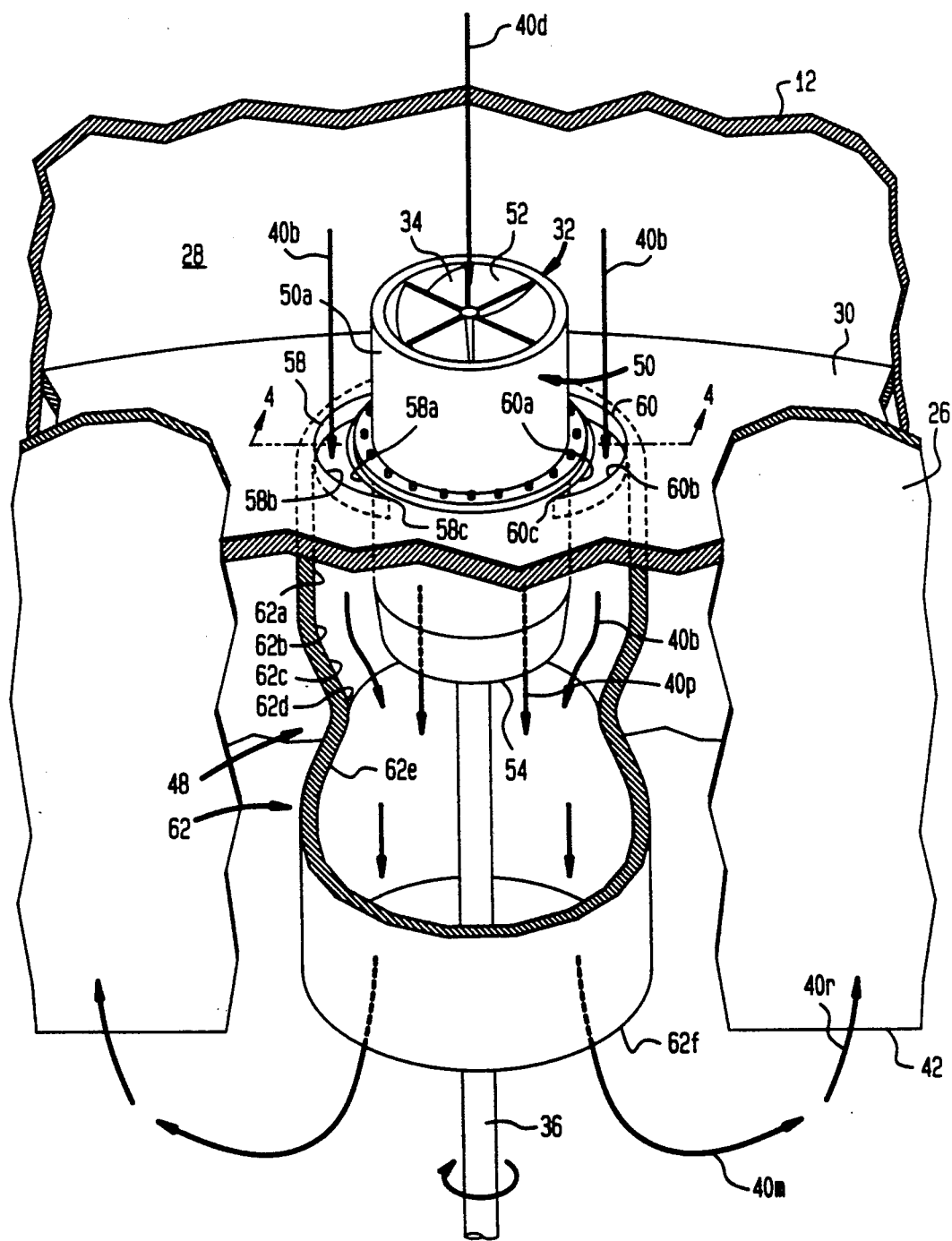
FIG. 3 is a perspective, partly sectional view, of a portion of one of the reactor internal pumps illustrated in FIG. 1 taken along line 3—3 including orifices and a conduit for bypassing a portion of the coolant flow around the reactor internal pump.
Figure 4:
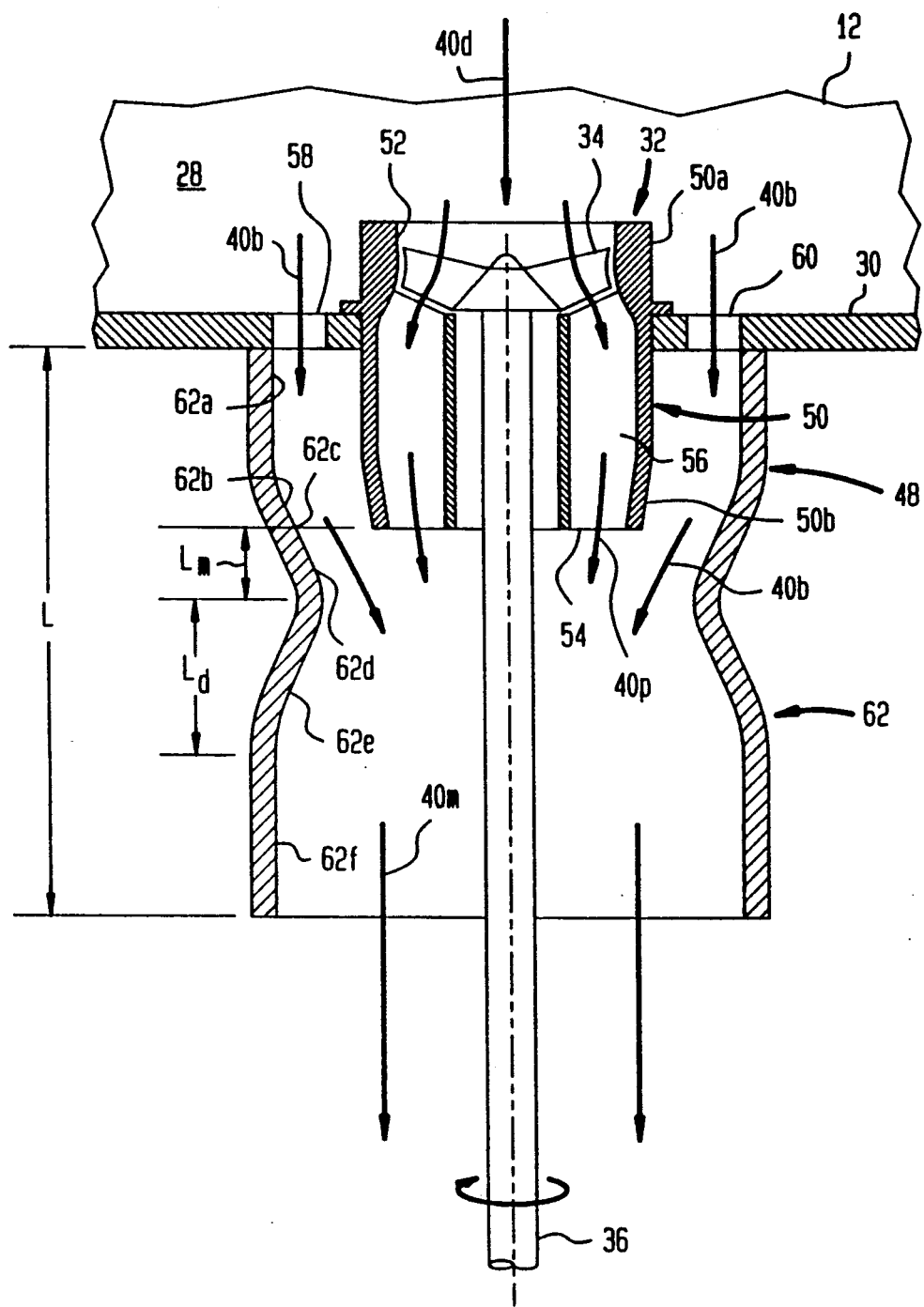
FIG. 4 is a longitudinal sectional view of the reactor internal pump and bypassing means illustrated in FIG. 3 taken along the plane indicated by line 4—4.

In accordance with one embodiment of the present invention, the reactor coolant recirculation system illustrated in FIGS. 1 and 2 preferably includes means 48 for bypassing the RIPs 32 and channeling a portion of the reactor downcomer coolant 40d downwardly by natural recirculation, i.e. gravity, as bypass flow 40b, as shown in more particularity in FIGS. 3 and 4, through the deck 30 when the RIPs 32 are in the inoperable mode following a pump trip.

More specifically, and referring to FIGS. 3 and 4, each of the RIPs 32 further includes an outer casing 50 surrounding the impeller 34, and having an inlet 52 at the top thereof and an outlet 54 at the bottom thereof. A plurality of conventional straightening vanes 56, as shown in FIG. 4 are fixedly joined to the inside of the casing 50 between the impeller 34 and the RIP outlet 54. A portion of the downcomer coolant 40d is channeled into the RIP inlet 52, pressurized by the rotating impeller 34 in the pumping mode, and is pumped downwardly through the RIP outlet 54 as pump flow 40p which is discharged into the lower plenum 16 for flow into the core inlet 42.

In a preferred embodiment of the present invention, the bypassing means 48 include a plurality of circumferentially spaced bypass orifices preferably arranged in pairs including a first bypass orifice 58 and a second bypass orifice 60 disposed in the deck 30 for channeling the coolant bypass flow 40b from the downcomer 28 and through the deck 30 for flow to the lower plenum 16 and the core inlet 42 in parallel flow with the RIPs 32. Although the bypass orifices 58, 60 may be located at various locations in the deck 30 between the RIPs 32, they are preferably disposed in pairs adjacent to respective ones of the RIPs 32.

In the preferred embodiment, the first and second orifices 58, 60 are diametrically opposed across each of the respective RIPs 32 in the circumferential direction around the vessel centerline axis 14, as shown more particularly in FIGS. 2 and 3. They are also preferably crescent shaped each having a concave side 58a, 60a facing the RIP 32, and a convex side 58b, 60b facing away from the RIP 32. Each of the orifices has a pair of side apexes 58c and 60c which are spaced from the vessel 12 and the core shroud 26. In this way, the orifices 58, 60 may be positioned closely adjacent to respective ones of the RIPs 32 with the concave sides 58a and 60a having about the same curvature as that of the outer casing 50.

This preferred arrangement of the orifices 58, 60 adjacent to respective ones of the RIPs 32 is utilized for obtaining both the bypass flow 40b as further discussed below, and for ensuring acceptable structural integrity of the support deck 30 while also minimizing the distance between the inner and outer radii of the annular support pump deck 30 and the downcomer 28. Since the support deck 30 supports the RIPs 32, which may be bolted thereto for example, the crescent shaped orifices 58 both allow for flow through the deck 30 while providing a reduced discontinuity in the load bearing capability of the deck 30 adjacent to the RIPs 32. Since the orifices 58 and 60 are crescent shaped, diametrically opposed in the circumferentially direction, the support deck 30 remains continuous between the RIPs 32 and both the core shroud 26 and the vessel 12 for providing a direct load bearing path for supporting the RIPs 32.

Referring again to FIGS. 3 and 4, the bypassing means 48 preferably further include a plurality of conduits 62 each conduit 62 surrounding a respective one of the RIPs 32 below the pump deck 30 and disposed in flow communication with at least one and preferably both of the first and second bypass orifices 58 and 60. Each of the conduits 62 cooperates with a respective one of the RIPs 32 to form a fluid jet pump, or eductor, therewith for drawing by suction the bypass flow 40b downwardly through the orifices 58 and 60 when the RIP 32 is in the pumping mode and to reduce or prevent backflow upwardly through the orifices 58, 60.

More specifically, the RIP outer casing 50 includes a forward end 50a which extends upwardly above the pump deck 30, and an aft end 50b which extends downwardly from the pump deck 30 terminating in the pump outlet 54 for discharging the pump flow 40p. Each of the conduits 62 is spaced radially outwardly from the RIP casing aft end 50b and includes an inlet 62a disposed adjacent to the bypass orifices 58 and 60 for receiving the bypass flow 40b from the downcomer 28, a converging section 62b which converges relative to the casing aft end 50b to a throat 62c defined therebetween at the outlet 54, a mixing section 62d extending downstream from the throat 62c and the outlet 54 in which the bypass flow 40b is mixed with the pump flow 40p for forming a coolant mixed flow 40m, a diverging diffuser section 62e extending downstream from the mixing section 62c, and a cylindrical outlet 62f extending downstream from the diffuser section 62e. In a preferred embodiment, the aft end 50b of the RIP outer casing 50 is preferably conical and slopes inwardly in the downstream direction for forming the converging section 62b with the conduit 62.

In the pumping mode, the RIP 32 is effective for discharging the pump flow 40p from the RIP outlet 54 as a jet having kinetic energy for cooperating with the conduit 62 for forming the jet pump for drawing by suction the bypass flow 40b from the orifices 58 and 60 for mixing with the pump flow 40p. From the mixing section 62d, the mixed coolant flow 40m is channeled through the diffuser section 62e wherein its velocity is decreased and its static pressure is increased by momentum transfer. The pressurized mixed coolant flow 40m is discharged from the conduit outlet 62f into the lower plenum 16 for flow into the core inlet 42. As shown in FIG. 3 for example, the bottom end of the core shroud 26 defining the core inlet 42 is disposed adjacent to the conduit outlet 62f at about the same vertical height for providing direct flow of the reactor coolant from the conduit 62 to the core inlet 42.

In a preferred embodiment, the jet pumps defined by the conduits 62 and the RIPs 32 are conventionally sized and configured for drawing the bypass flow 40b through the orifices 58 and 60 in the pumping mode without backflow therethrough. For example, the lengths $L_m$ and $L_d$ of the mixing section 62c and the diffuser section 62e, respectively, can be made conventionally long for maximizing the suction pressure generated at the orifices 58 and 60 and prevent backflow therethrough. However, whereas a conventional jet pump may have a total length of about 6–7 meters, the total length L of the conduit 62 may be as small as about 1 meter for obtaining an acceptable compromise in both natural recirculation flow through the orifices 58 and 60 and in powered flow by the RIPs 32.

More specifically, in one embodiment analyzed, the conduits 62 have a length of about 1 meter and the collective flow area of the orifices 58 and 60 is on the order of about 1/100 that of the RIP outlets 54. Following a pump trip, an increase in gravity-driven natural recirculation flow of the reactor coolant 40 into the core 18 due to the orifices 58 and 60 is predicted as compared to the flow solely through the inoperable RIPs 32 without the orifices 58 and 60.

The short conduits 62 also allow retrofit installation in existing reactor vessels, and may be used to maintain the inlets of the RIPs 32 at the lowest possible elevation to avoid cavitation due to reduced pressure boiling of the downcomer coolant 40d.

Accordingly, the orifices 58 and 60 and the conduit 62 provide an effective bypass around the RIPs 32 for increasing natural recirculation during a pump trip, but at the same time, are effective for preventing unacceptable backflow recirculation into the downcomer 28 while the RIPs 32 are operated. By suitable conventional design of the orifices 58 and 60 and the conduit 62, the suction pressure at the orifices 58 and 60 may be maximized during operation of the RIPs 32 and backflow recirculation therethrough may be eliminated as above described.

While there have been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention. Accordingly, what is desired to be secured by Letters Patent of the United States is the invention as defined and differentiated in the following claims:

We claim:

1. A recirculation system for boiling water reactor having a cylindrical shroud surrounding a reactor core and spaced radially inwardly from a pressure vessel to define an annular downcomer for channeling downwardly a recirculation reactor coolant into an inlet of the core disposed at a lower plenum of said vessel comprising:

an annular pump deck disposed in said downcomer and fixedly joined to said vessel and said core shroud;

a plurality of circumferentially spaced reactor internal pumps (RIPs) each joined to said deck and operable in a pumping mode for pumping downwardly said reactor coolant from said downcomer, through an outlet of said RIP as pump flow for flow into said core inlet; and means for bypassing said RIPs and channeling a portion of said reactor coolant downwardly by natural recirculation as bypass flow through said deck when said RIPs are in an inoperable mode, said bypassing means including:

a plurality of circumferentially spaced bypass orifices disposed in said deck for channeling said bypass flow from said downcomer and through said deck for flow to said core inlet; and a plurality of conduits each surrounding a respective one of said RIPs and disposed in flow communication with at least a respective first one of said bypass orifices and cooperating with said one RIP to form a respective jet pump for drawing said bypass flow downwardly through said first bypass orifice when said RIP is in said pumping mode.

2. A recirculation system according to claim 1 wherein:

each of said RIPs include an outer casing having an aft end terminating in said RIP outlet for discharging said pump flow;

a respective one of said conduits is spaced radially outwardly from said RIP casing aft end to define an annular throat at said RIP outlet; and said RIP is effective for discharging from said RIP outlet said pump flow as a jet for drawing said bypass flow from said first orifice and through said throat for mixing with said pump flow.

3. A recirculation system according to claim 2 when said respective conduit further includes:

an annular mixing section extending from said throat downstream of said RIP outlet for mixing said pump flow with said bypass flow;

a diffuser section for decreasing velocity of said mixed flow and increasing pressure thereof; and a jet pump outlet for discharging said mixed flow from said conduit into said lower plenum.

4. A recirculation system according to claim 3 wherein said core shroud has a bottom end and said jet pump outlet is disposed adjacent thereto.

5. A recirculation system according to claim 3 wherein each of said conduits is disposed in flow communication with both said first bypass orifice and a second bypass orifice for collectively receiving said bypass flow.

6. A recirculation system according to claim 5 wherein said first and second bypass orifices are disposed adjacent to respective ones of said RIPs.

7. A recirculation system according to claim 6 wherein said first and second bypass orifices are diametrically opposed across said RIP.

8. A recirculation system according to claim 7 wherein said first and second bypass orifices are crescent shaped having a concave side facing said RIP, and a convex side facing away from said RIP.

9. A recirculation system according to claim 3 wherein each of said jet pumps is sized and configured for drawing said bypass flow through said bypass orifices in said pumping mode without backflow therethrough.

* * * * *